United States Patent
DeSanto et al.

(10) Patent No.: US 7,298,947 B2
(45) Date of Patent: Nov. 20, 2007

(54) OPTICAL PANEL SYSTEM INCLUDING STACKABLE WAVEGUIDES

(75) Inventors: Leonard DeSanto, Dunkirk, MD (US); James T. Veligdan, Manorville, NY (US)

(73) Assignee: Brookhaven Science Associates, Upton, NY (US)

(*) Notice: Subject to any disclaimer, the term of this patent is extended or adjusted under 35 U.S.C. 154(b) by 0 days.

(21) Appl. No.: 11/714,338

(22) Filed: Mar. 5, 2007

(65) Prior Publication Data
US 2007/0211994 A1 Sep. 13, 2007

Related U.S. Application Data

(62) Division of application No. 10/831,924, filed on Apr. 26, 2004, now Pat. No. 7,187,831.

(51) Int. Cl.
G02B 6/06 (2006.01)
G02B 6/10 (2006.01)
G02B 6/26 (2006.01)

(52) U.S. Cl. .................... 385/116; 385/129; 385/52

(58) Field of Classification Search ................ 385/116, 385/129, 52
See application file for complete search history.

(56) References Cited

U.S. PATENT DOCUMENTS

| | | | |
|---|---|---|---|
| 3,253,500 A | 5/1966 | Hicks, Jr. |
| 3,797,910 A | 3/1974 | Westwig |
| 3,874,783 A | 4/1975 | Cole |
| 4,090,104 A | 5/1978 | Vann et al. |
| 4,116,739 A | 9/1978 | Glenn |
| 4,261,657 A | 4/1981 | Reiback |
| 4,344,668 A | 8/1982 | Gunther et al. |
| 4,418,986 A | 12/1983 | Yata et al. |
| 4,469,402 A | 9/1984 | Yata et al. |
| 4,586,781 A | 5/1986 | Gunther et al. |
| 4,674,836 A | 6/1987 | Yata et al. |
| 4,729,631 A | 3/1988 | Takahashi et al. |
| 4,919,513 A | 4/1990 | Nakakuki et al. |
| 5,009,483 A | 4/1991 | Rockwell, III |

(Continued)

OTHER PUBLICATIONS

Veligdan, "Unique Interactive Projection Display Screen", Sep. 29, 1997, 7 pages.

(Continued)

Primary Examiner—K. Cyrus Kianni
(74) Attorney, Agent, or Firm—Matthew J. Esserman

(57) ABSTRACT

An optical panel system including stackable waveguides is provided. The optical panel system displays a projected light image and comprises a plurality of planar optical waveguides in a stacked state. The optical panel system further comprises a support system that aligns and supports the waveguides in the stacked state. In one embodiment, the support system comprises at least one rod, wherein each waveguide contains at least one hole, and wherein each rod is positioned through a corresponding hole in each waveguide. In another embodiment, the support system comprises at least two opposing edge structures having the waveguides positioned therebetween, wherein each opposing edge structure contains a mating surface, wherein opposite edges of each waveguide contain mating surfaces which are complementary to the mating surfaces of the opposing edge structures, and wherein each mating surface of the opposing edge structures engages a corresponding complementary mating surface of the opposite edges of each waveguide.

40 Claims, 9 Drawing Sheets

U.S. PATENT DOCUMENTS

| | | | |
|---|---|---|---|
| 5,066,947 A | 11/1991 | Du Castel | |
| 5,106,181 A * | 4/1992 | Rockwell, III | 385/2 |
| 5,151,956 A | 9/1992 | Bloemer | |
| 5,274,406 A | 12/1993 | Tejima et al. | |
| 5,381,502 A | 1/1995 | Veligdan | |
| 5,422,691 A | 6/1995 | Ninomiya et al. | |
| 5,455,882 A | 10/1995 | Veligdan | |
| 5,481,385 A * | 1/1996 | Zimmerman et al. | 349/62 |
| 5,521,725 A | 5/1996 | Beeson et al. | |
| 5,543,870 A | 8/1996 | Blanchard | |
| 5,565,839 A | 10/1996 | Poss | |
| 5,594,561 A | 1/1997 | Blanchard | |
| 5,625,736 A | 4/1997 | Veligdan | |
| 5,642,449 A | 6/1997 | Phillips | |
| 5,647,036 A | 7/1997 | Deacon et al. | |
| 5,668,907 A | 9/1997 | Veligdan | |
| 5,684,905 A | 11/1997 | Sugawara et al. | |
| 5,696,862 A | 12/1997 | Hauer et al. | |
| 5,715,337 A * | 2/1998 | Spitzer et al. | 385/4 |
| 5,716,118 A | 2/1998 | Sato et al. | |
| 5,764,845 A | 6/1998 | Nagatani et al. | |
| 5,821,911 A | 10/1998 | Jachimowicz | |
| 5,838,865 A | 11/1998 | Gulick | |
| 5,914,760 A | 6/1999 | Daiku | |
| 5,940,565 A | 8/1999 | Sugawara | |
| 5,985,069 A | 11/1999 | Kawabe et al. | |
| 6,002,826 A | 12/1999 | Veligdan | |
| 6,012,816 A | 1/2000 | Beiser | |
| 6,031,954 A | 2/2000 | Higuchi | |
| 6,222,971 B1 | 4/2001 | Veligdan et al. | |
| 6,301,417 B1 | 10/2001 | Biscardi et al. | |
| 6,317,545 B1 * | 11/2001 | Veligdan | 385/120 |
| 6,389,206 B1 | 5/2002 | Veligdan | |
| 6,400,876 B1 | 6/2002 | Biscardi et al. | |
| 6,487,350 B1 | 11/2002 | Veligdan et al. | |
| 6,519,400 B2 | 2/2003 | Biscardi et al. | |
| 6,535,674 B2 | 3/2003 | Veligdan | |
| 6,571,044 B2 | 5/2003 | Veligdan | |
| 6,597,417 B1 | 7/2003 | Veligdan | |
| 6,636,355 B2 | 10/2003 | Moshrefzadeh et al. | |
| 6,650,822 B1 * | 11/2003 | Zhou | 385/147 |
| 6,685,792 B2 | 2/2004 | Veligdan et al. | |
| 6,832,727 B2 * | 12/2004 | Veligdan | 235/462.32 |
| 2002/0050523 A1 * | 5/2002 | Veligdan | 235/462.07 |
| 2002/0140879 A1 * | 10/2002 | Fujieda | 349/69 |
| 2003/0072077 A1 | 4/2003 | Peterson et al. | |
| 2004/0071417 A1 * | 4/2004 | Veligdan | 385/120 |
| 2005/0238303 A1 * | 10/2005 | DeSanto et al. | 385/120 |
| 2005/0276072 A1 * | 12/2005 | Hayashi et al. | 362/609 |

OTHER PUBLICATIONS

Beiser, et al., "Ten Inch Planar Optic Display", Proceedings of the International Society for Optical Engineering (SPIE), vol. 2734, Apr. 1996, 9 pages.

Yoder, "The State-of-the-Art in Projection Display: An Introduction of the Digital Light Processing DLP", Texas Instruments Web Site, Mar. 1997, 5 pages.

DeSanto, et al., "Polyplanar Optical Display Electronics", Proceedings of the International Society (SPIE), vol. 3057, Apr. 1997, 12 pages.

* cited by examiner

OPTICAL PANEL SYSTEM INCLUDING STACKABLE WAVEGUIDES

This application is a divisional of U.S. patent application Ser. No. 10/831,924, filed Apr. 26, 2004, issuing on Mar. 6, 2007 as U.S. Pat. No. 7,187,831.

STATEMENT REGARDING FEDERALLY SPONSORED RESEARCH OR DEVELOPMENT

This invention was made with Government support under Contract No. DE-AC02-98CH10886 awarded by the Department of Energy. The Government has certain rights in this invention.

FIELD OF THE INVENTION

The present invention relates generally to the field of optical panels, and, more specifically, to optical panel systems including stackable waveguides.

BACKGROUND OF THE INVENTION

For large venues, e.g. stadiums, arenas, theaters, fields, etc., large jumbotron-type display screens have been widely used to display various images to audiences attending events such as, for example, sporting events, theatrical events, movies, concerts, speeches, etc. Although these large display screens do an adequate job of displaying images to vast numbers of people, the large size of the displays makes their assembly at venues extremely difficult and time-consuming. Moreover, the sheer size of these display screens requires complicated and expensive procedures and techniques to transport the display screens from venue to venue.

Thus, it is desirable to provide a display screen which is able to overcome the above disadvantages and which can be quickly and easily assembled in situ and subsequently disassembled for transport in an inexpensive and efficient fashion.

It is therefore desirable to provide an optical panel system including stackable waveguides that can be utilized in large-size venue situations (as well as any size venue situation), and that does not suffer from the above drawbacks experienced by large display screens. Additionally, while addressing these problems, the optical panel system including stackable waveguides of the present invention will simultaneously provide superior high contrast desired in high ambient light situations (or any light situation).

These and other advantages of the present invention will become more fully apparent from the detailed description of the invention hereinbelow.

SUMMARY OF THE INVENTION

The present invention is directed to an optical panel system for displaying a projected light image, comprising a plurality of planar optical waveguides in a stacked state, each waveguide having a first end and a second end, wherein an inlet face is defined by the plurality of first ends. The optical panel system also comprises a support system that aligns and supports the waveguides in the stacked state such that the waveguides are in a predetermined configuration, wherein each waveguide is held in position relative to an adjacent waveguide using the support system while the waveguides are in the predetermined configuration. The support system may comprise at least one rod, wherein each waveguide contains at least one hole, and wherein each rod is positioned through a corresponding one of the at least one hole to thereby provide the waveguides in the predetermined configuration.

The support system may alternatively comprise at least two opposing edge structures having the waveguides positioned therebetween, and wherein the at least two opposing edge structures engage opposite edges of each waveguide to thereby provide the waveguides in the predetermined configuration. At least one of the at least two opposing edge structures may be a rod.

At least one of the at least two opposing edge structures may contain a mating surface, wherein at least one of the opposite edges of each waveguide may contain a mating surface which is complementary to the mating surface of the at least one opposing edge structure, and wherein each mating surface of the at least one opposing edge structure may engage a corresponding complementary mating surface of the at least one of the opposite edges of each waveguide to thereby provide the waveguides in the predetermined configuration. At least one mating surface of the at least one opposing edge structure may be substantially dovetail-shaped, substantially L-shaped, or substantially U-shaped. The opposing edge structures may contain a plurality of waveguide positioning elements which position each waveguide a predetermined distance from an adjacent waveguide.

The waveguides may comprise transparent strips formed of a material have a first index of refraction, and wherein each of the strips is surrounded by air having a second index of refraction which is lower than the first index of refraction while the waveguides are in the predetermined configuration. A black strip may be positioned between each of the strips surrounded by air.

Alternatively, the waveguides may comprise transparent strips formed of a material having a first index of refraction, and wherein each of the strips has a coating on each side thereof of a cladding material having a second index of refraction which is lower than the first index of refraction. At least one of the cladding material coatings of each strip may have a black layer coating thereon.

The optical panel system may further comprise at least one coupler provided at the inlet face to thereby redirect image light entering the inlet face. Each of the plurality of first ends of the waveguides may be beveled such that the inlet face is serrated to thereby redirect image light entering the inlet face.

An outlet face may be defined by the plurality of second ends, and wherein each of the plurality of second ends of the waveguides may be beveled such that the outlet face is serrated to thereby redirect image light emitted from the outlet face.

The optical panel system may further comprise a plurality of waveguide positioning elements (which differ from the waveguide positioning elements of the opposing edge structures described above) which position each waveguide a predetermined distance from an adjacent waveguide. The waveguide positioning elements in this embodiment may be located between adjacent waveguides such that each waveguide is surrounded by air while the waveguides are in the predetermined configuration. These waveguide positioning elements may comprise particulates.

In one embodiment, each waveguide may comprise a plurality of planar sub-waveguides, wherein each sub-waveguide may be bonded to an adjacent sub-waveguide within each waveguide. Each sub-waveguide may comprise a transparent strip formed of a material having a first index of refraction, and wherein the strip has a coating on each side thereof of a cladding material having a second index of refraction which is lower than the first index of refraction. A sub-inlet face may be defined by each first end of each waveguide, wherein the optical panel system may further comprise at least one coupler provided at each sub-inlet face of each waveguide to thereby redirect image light entering the sub-inlet face.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 2:
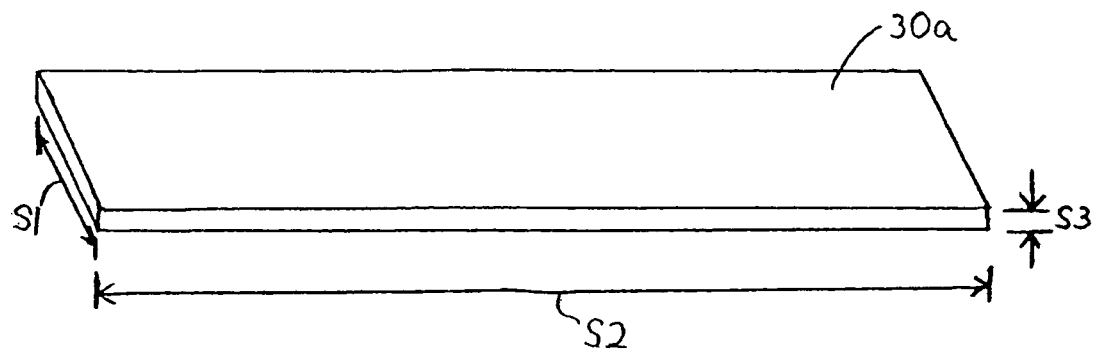
FIG. 2 is an isometric view of a waveguide strip, in accordance with a preferred embodiment of the present invention.

It is to be understood that the figures and descriptions of the present invention may have been simplified to illustrate elements that are relevant for a clear understanding of the present invention, while eliminating, for purposes of clarity, other elements found in a typical optical panel system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Figure 1:
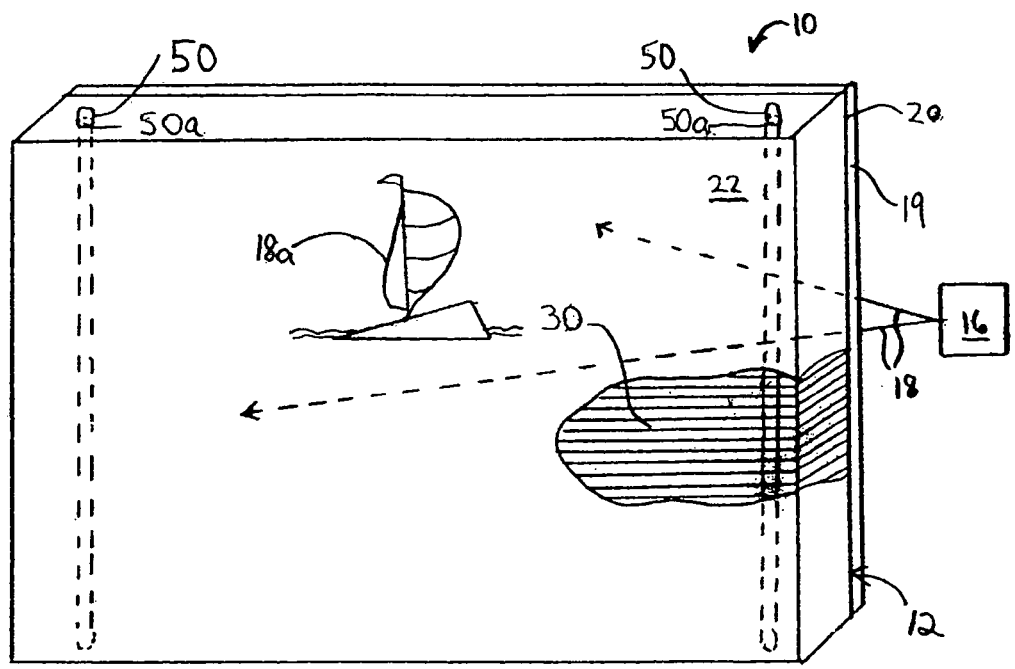
FIG. 1 is an isometric view, in partially broken away form, illustrating an optical panel system including a light directing film, in accordance with a preferred embodiment of the present invention.

Illustrated in FIG. 1 is an optical panel system 10 in accordance with an exemplary embodiment of the present invention. The display is an assembly of components including an optical panel 12 having any desired aspect ratio of horizontal width to vertical height for any desired application. An exemplary large video image optical panel is illustrated, and may have a diagonal screen measurement of 15 feet for example. Although smaller or larger diagonal screen measurements may be contemplated.

The optical panel 12 cooperates with a projector 16 suitably configured for projecting image light 18 in the form of a beam through the panel for producing a video image 18a for direct viewing by an observer facing the panel. The projector 16 may take any conventional form capable of projecting a viewable image.

For example, the image beam 18 is initially generated as plain, unmodulated light in a suitable light source, which may be a bright incandescent bulb, or laser, or any other suitable light source. The initial light may be monochromatic, or have color as desired.

The plain light is then spatially modulated in a modulator for creating individual picture elements, or pixels, which define the desired video image or pattern. The modulator may take any conventional form such as a liquid crystal display (LCD) or a Digital Micromirror Device (DMD).

The LCD is a light transmissive device having portions which are selectively rendered opaque for selectively interrupting the light at selected pixels. The DMD is a light reflective device and has individual micromirrors which are selectively tiltable to reflect the light toward the panel or away therefrom for defining corresponding pixels.

Suitable imaging optics, including lenses, may be optically aligned between the panel and the light modulator for horizontally and vertically scaling and focusing the image beam as required over the back side of the panel for transmission therethrough. The light source, modulator, and imaging optics may be connected as one integral unit, or the location of each of these components may differ as desired. For example, each component may be separate from one another by some distance.

The optical panel 12 is comprised of a plurality of stacked optical waveguides 30 comprising cores/strips 30a of polymer, plastic, or glass, or combinations thereof. In a preferred embodiment, plexiglas® would be selected as the preferred material for the core 30a of the stacked waveguides 30. FIG. 2 illustrates exemplary dimensions (i.e. not drawn to scale) of one of the cores/strips 30a forming a waveguide 30, with S1 (length)=1 inch, S2 (width)=10 feet, and S3 (thickness) =¼ inch. Of course, the dimensions and size of the strips 30a may differ from this example. Additionally, the size and dimensions of each of the individual strips 30a may either be substantially identical or different from other strips 30a within the same stack of waveguides 30. The waveguides are preferably planar (i.e. in the form of flat ribbons) extending continuously in the horizontal direction along the entire optical panel.

Each waveguide 30 has a first end 30e and a second end 30f (see, for example, FIGS. 4-13), wherein an inlet face 20 is defined by the plurality of first ends 30e, and wherein an outlet face 22 is defined by the plurality of second ends 30f. Also shown in FIG. 1 is an optional light coupler 19 which is provided at the inlet face 20 to thereby redirect image light 18 entering the inlet face 20.

In one embodiment, the optical panel 12 is comprised of waveguides 30 comprising optically transparent strips 30a (having, for example, a refractive index n=1.49) surrounded by air (having, for example, a refractive index n=1) between the strips. To provide even a microscopic layer of air, the strips may be placed directly on one another. In this case, this microscopic layer of air is sufficient in functioning as a relatively low index of refraction material as compared to the material comprising the strips, thereby resulting in substantially total internal reflection (TIR) of image light 18 from the inlet face 20 to the outlet face 22.

In another embodiment, a black layer (of dark color or black material, both referred to as "black" herewithin) may be added between each of the transparent strips in order to increase contrast of the optical panel 12. This black layer would help to absorb ambient light. It would also make the screen appear significantly darker thereby improving contrast. A thin black layer of, for example, a polymer could be placed between each of the strips in FIG. 1. Each of the transparent strips could be ¼ inch (see S3 in FIG. 2) while each of the black layers may be as thin as 0.0005 inch for example. A thicker black layer may be more practical for construction and handling purposes. Of course, smaller or larger black layer thicknesses may be contemplated. The black layers may preferably have the same length and width (i.e. FIG. 2's S1 and S2, respectively) as that of the strips.

Figure 16:
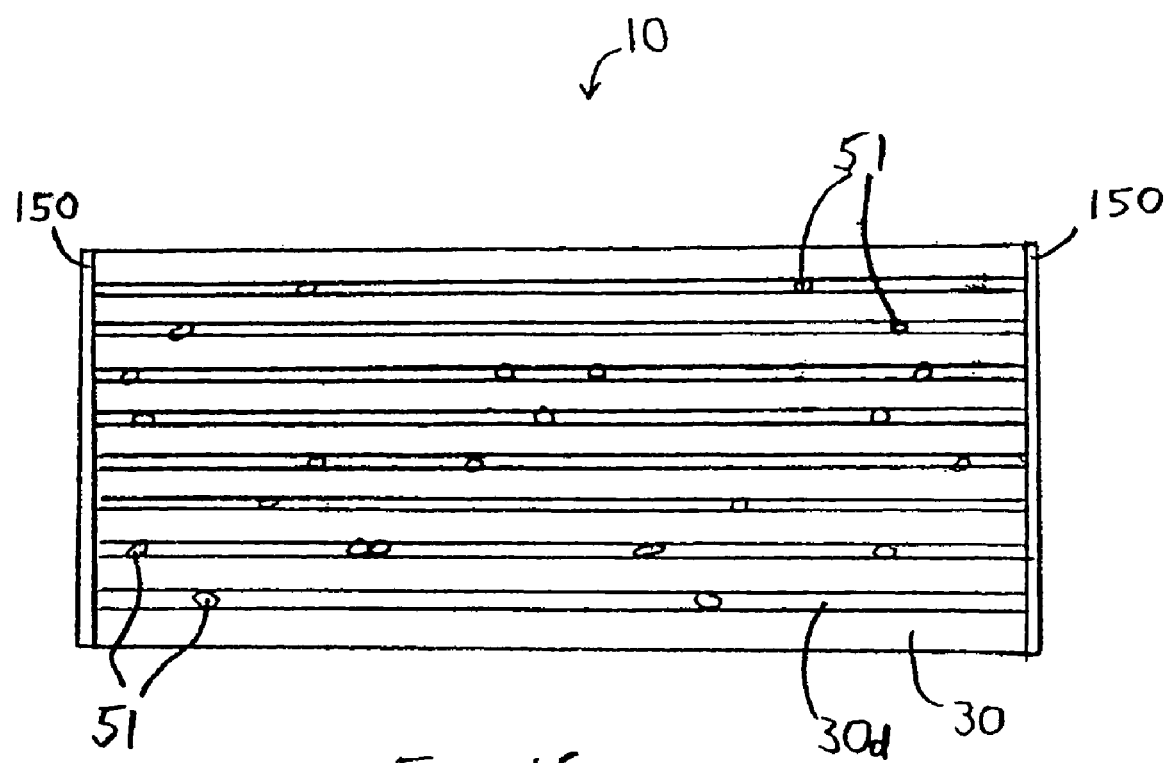
FIG. 16 is a front view of an optical panel system including waveguide positioning elements comprising particulates, in accordance with a preferred embodiment of the present invention.

Instead of relying on a microscopic layer of air between each strip, the strips may be intentionally separated via utilization of a plurality of waveguide positioning elements such that the strips are surrounded by air 30d while in the stacked state. These waveguide positioning elements may be provided between adjacent strips and may be comprised of particulates 51 (FIG. 16) comprising, for example, a polymer, a plastic, a glass, or combinations thereof.

Figure 17:
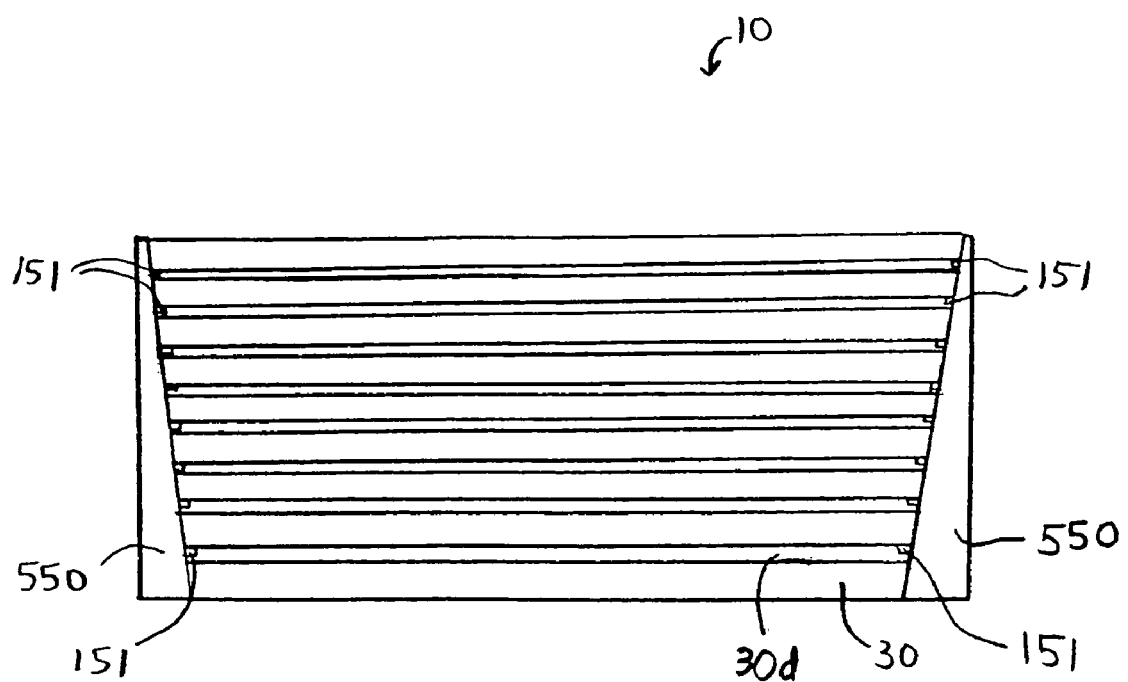
FIG. 17 is a front view of an optical panel system including waveguide positioning elements comprising tabs, in accordance with a preferred embodiment of the present invention.

In an alternative embodiment, the opposing edge structures (50, 150, 250, 350, 450 described below and as illustrated in FIGS. 1 and 4-8) may include a plurality of waveguide positioning elements to position each strip or waveguide a predetermined distance from an adjacent waveguide. In this embodiment, the waveguide positioning elements may comprise items selected from the group consisting of a bead, hook, indent, groove, protrusion, notch, tab, nail, screw, bolt, spike, pin, brad, tack, or combinations thereof. For example, when utilizing tabs 151 (FIG. 17—such as the type, for example, used in bookshelves), the waveguides would rest on the tabs 151 which act as a ledge for the edges of the waveguides (similar to the shelves of bookshelves resting on their tabs). Slanted opposing edge structure(s) 550 may optionally be utilized to facilitate stacking of the waveguides onto their corresponding tabs 151. Of course, slanted opposing edge structures (i.e. at least one or more) may be utilized in any embodiment in this disclosure (e.g. even without the waveguide positioning elements). When utilizing slanted opposing edge structures, the particular stacking order of the waveguides becomes an important factor.

Figure 3:
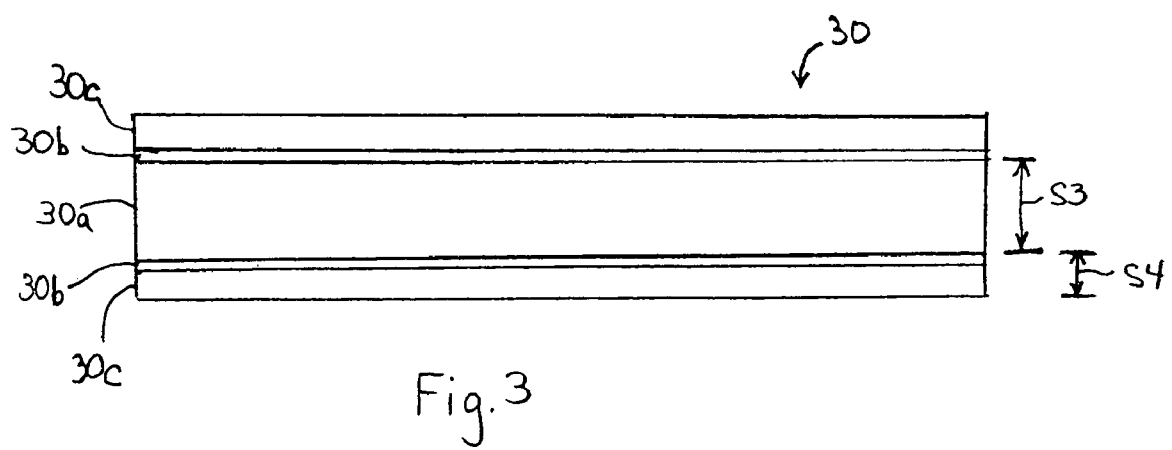
FIG. 3 is a cross-sectional side view of a waveguide strip coated on each side thereof with a cladding layer and with a black layer, in accordance with a preferred embodiment of the present invention.
Figure 4:
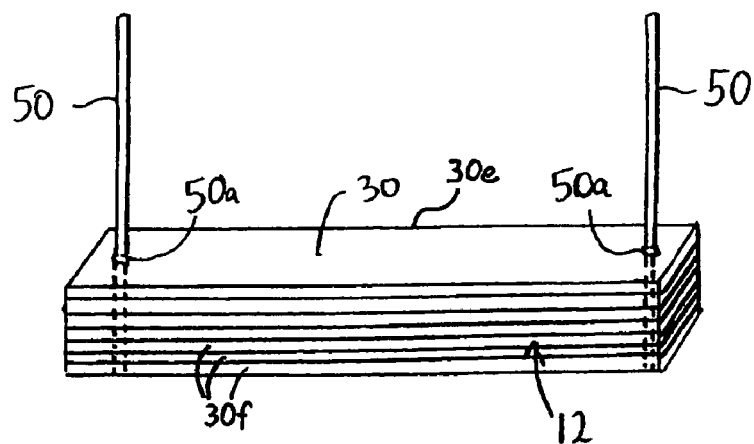
FIG. 4 is an isometric view of a partially constructed optical panel system including support rods which are provided through holes in each waveguide, in accordance with a preferred embodiment of the present invention.

In a more preferred embodiment, air would not be utilized as the low index cladding. Rather, the individual strips 30a would each be coated with a low index cladding material 30b and optionally, a black layer 30c as shown in FIG. 3. The cladding layers 30b have a second index of refraction lower than that of the strips 30a for providing substantially TIR of the image light as it is transmitted through the strips 30a. The cladding may be a suitable plastic or epoxy for example. Alternatively, instead of using a separate black layer 30c, the cladding material 30b itself may be black. The black cladding may be formed in any suitable manner such as with black spray paint, or carbon particles within an epoxy adhesive joining together the adjacent core in one or more cladding layers as desired.

As mentioned above, the thickness of the strip (S3) may be ¼ inch, while the combined thickness of the low index cladding 30b and the black layer 30c (S4 in FIG. 3) may be 0.0005 inch. In this preferred embodiment, the transparent strip may have a refractive index n=1.49 while the cladding layer may have a refractive index n=1.47 (i.e. rather than 1.0 for air as per the embodiment above). By keeping the refractive indices so close to each other in this preferred embodiment, the acceptance angles of the waveguides are limited to only accept the image light from the projector (i.e. if the projector is positioned at an optimum angle) while rejecting substantially all ambient light. This configuration allows the screen to be much blacker thereby resulting in significantly higher contrast of the displayed image 18a at the outlet face 22.

In order to align and support the waveguides 30 in a stacked state, a support system is utilized. In the embodiment illustrated in FIGS. 1 and 4, the support system includes 2 rods 50 which are positioned through corresponding holes 50a provided in each of the waveguides 30 to thereby provide the strips in a predetermined configuration. The holes may be provided towards, for example, opposite edges of each waveguide, and may be formed by various techniques such as, for example, drilling. To form the stack, the waveguides may be individually placed on the rods or a number of strips may be simultaneously placed on the rods. The waveguides are preferably stacked vertically on top of each other to form the optical panel height, and may number between about 300-3000 waveguides for providing 300-3000 lines of resolution, or more or less as desired.

Of course, any number of rods/holes may be contemplated with two of each being the optimum number. The rods 50 may take the form of wires or other forms. The rods may comprise any sufficiently rigid material such as, for example, plastic, glass, carbon fiber, wood, metal, or combinations thereof. The rods may preferably be transparent (e.g. comprised of a material having substantially the same refractive index as that of the strips 30a) or they may be comprised of an opaque material. The rods may be round in cross section or have any other cross-sectional shape. The rods preferable are in the form of wires each having a diameter of for example 0.05 inch Of course, the size of the rods may differ dependent on factors such as, for example, the overall size or weight of the display.

Figure 5:
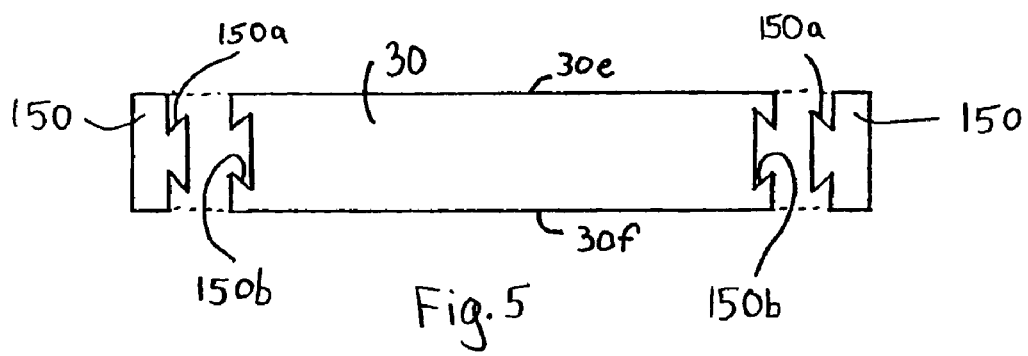
FIG. 5 is an exploded plan view of an optical panel system including two opposing edge support structures which contain dovetail mating surfaces, and including a stack of waveguides with opposite edges containing mating surfaces which are complementary to that of the mating surfaces of the opposing edge support structures, in accordance with a preferred embodiment of the present invention.

In another preferred embodiment, the support system includes at least two opposing edge structures 150 having the waveguides 30 positioned therebetween. The opposing edge structures 150 comprise a sufficiently rigid material and preferably have a dovetail-shaped cross section as illustrated in FIG. 5. The dovetail-shaped surfaces 150a engage opposite edges of each waveguide 30 (i.e. having a complementary mating dovetail-shaped surface 150b) to thereby provide the waveguides in a predetermined configuration. The shape of the mating surfaces may be different than the shape depicted in FIG. 5 as long as a secure engagement is achieved between the edge structures and the edges of the waveguides. The dovetail shape may be formed in the edge structures using various techniques such as, for example, during molding of the edge structures. Likewise, the complementary dovetail shape may be formed in the waveguides using various techniques such as, for example, by sawing the waveguides while in the predetermined (stacked) configuration.

Figure 6:
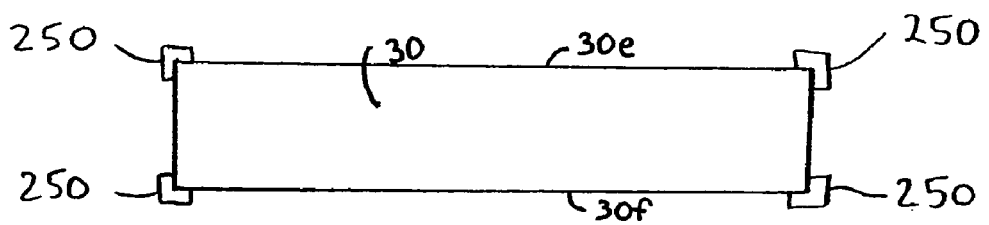
FIG. 6 is a plan view of an optical panel system including four opposing edge support structures which contain L-shaped mating surfaces, and including a stack of waveguides with opposite edges containing mating surfaces which are complementary to that of the mating surfaces of the opposing edge support structures, in accordance with a preferred embodiment of the present invention.
Figure 7:
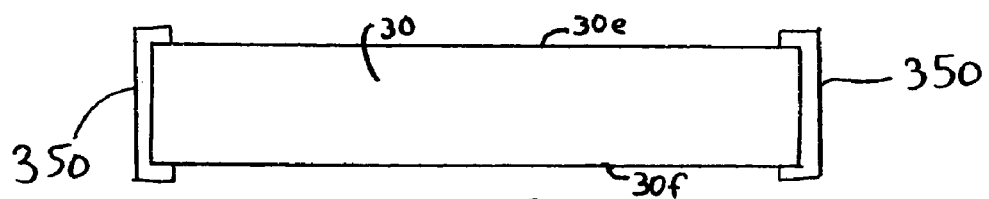
FIG. 7 is a plan view of an optical panel system including two opposing edge support structures which contain U-shaped mating surfaces, and including a stack of waveguides with opposite edges containing mating surfaces which are complementary to that of the mating surfaces of the opposing edge support structures, in accordance with a preferred embodiment of the present invention.
Figure 8:
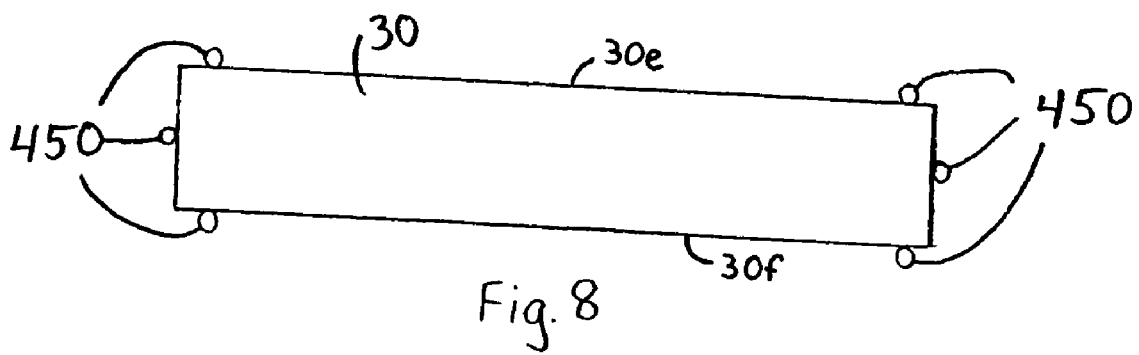
FIG. 8 is a plan view of an optical panel system including six opposing edge support structures in the form of support rods, and including a stack of waveguides with opposite edges engaging the opposing edge support structures, in accordance with a preferred embodiment of the present invention.

Other types of support systems may be contemplated. For example, the support system may instead utilize opposing edge structures 250 having L-shaped cross-sections which engage the edges of the waveguides at the waveguide corners as illustrated in FIG. 6. As another example, the support system may alternatively utilize opposing edge structures 350 having U-shaped cross-sections which engage the edges of the waveguides as illustrated in FIG. 7. As yet another example, the support system may alternatively utilize opposing edge structures 450 in the form of rods each having, for example, circular-shaped cross-sections. The rods engage the edges, fronts, and backs of the waveguides as illustrated in FIG. 8. Of course, a lesser or greater number of edge structures may be utilized than as depicted in FIGS. 5-8.

Figure 9:
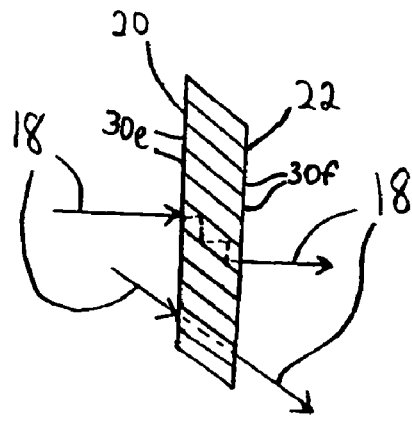
FIG. 9 is a side view of a waveguide stack including an angled waveguide configuration between parallel inlet and outlet faces, in accordance with a preferred embodiment of the present invention.
Figure 10:
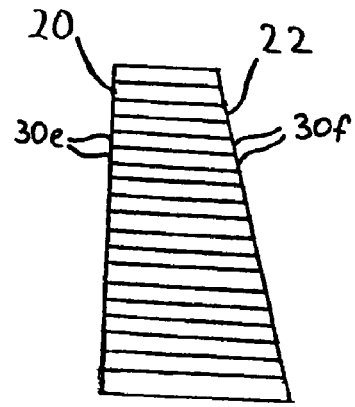
FIG. 10 is a side view of a waveguide stack including an inlet face which is non-parallel to an outlet face, in accordance with a preferred embodiment of the present invention.
Figure 11:
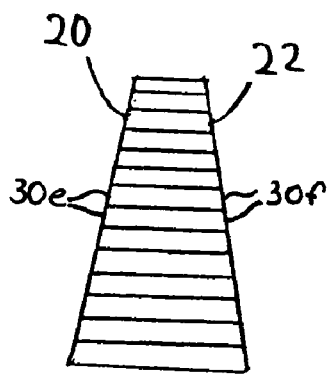
FIG. 11 is a side view of a waveguide stack which is trapezoidal-shaped including an inlet face which is non-parallel to an outlet face, in accordance with a preferred embodiment of the present invention.
Figure 12:
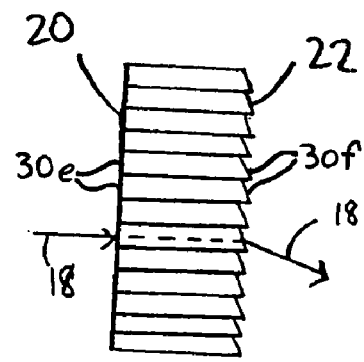
FIG. 12 is a side view of a waveguide stack including light-directing serrations at an outlet face, in accordance with a preferred embodiment of the present invention.
Figure 13:
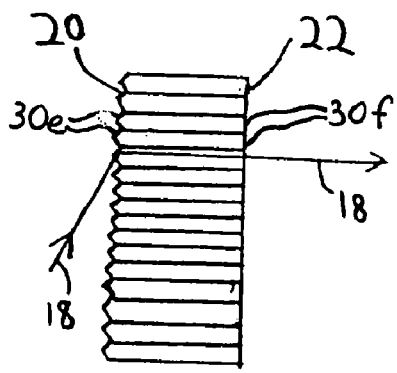
FIG. 13 is a side view of a waveguide stack including light-directing prisms at an inlet face, in accordance with a preferred embodiment of the present invention.
Figure 14:
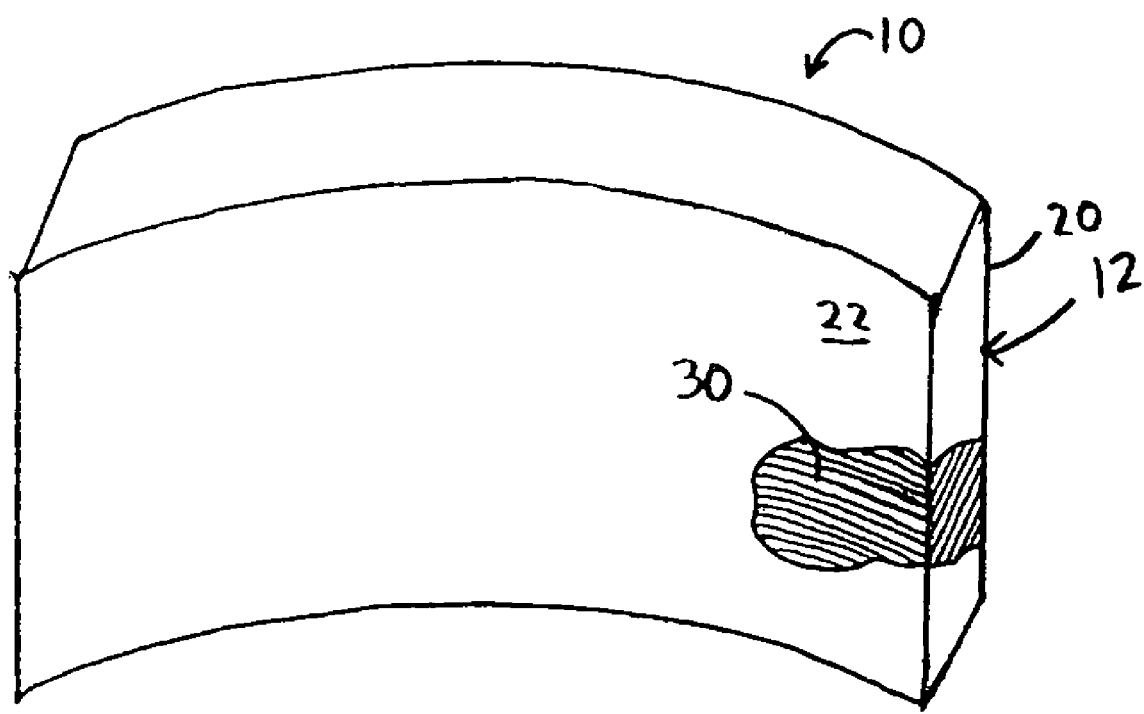
FIG. 14 is an isometric view of a waveguide stack including curved inlet and outlet faces, in accordance with a preferred embodiment of the present invention.

While in the predetermined configuration, the waveguide stack may have the inlet face being substantially parallel to the outlet face, with the inlet face and the outlet face being substantially perpendicular to a direction of image light within each of the waveguides as illustrated in FIG. 1. In another embodiment, the waveguide stack may have the inlet face being substantially parallel to the outlet face, with the inlet face and the outlet face being angled relative to a direction of image light within each of the waveguides as illustrated in FIG. 9. In another embodiment, the waveguide stack may have the inlet face being angled relative to the outlet face as illustrated in FIGS. 10 and 11. In another embodiment, each of the plurality of second ends of the waveguides is beveled such that the outlet face is serrated to thereby redirect image light emitted from the outlet face as illustrated in FIG. 12. In another embodiment, each of the plurality of first ends of the waveguides is beveled such that the inlet face is serrated to thereby redirect image light entering the inlet face as illustrated in FIG. 13. In another embodiment, the waveguide stack may have at least one of the inlet face and the outlet face being curved as illustrated in FIG. 14.

Figure 15:
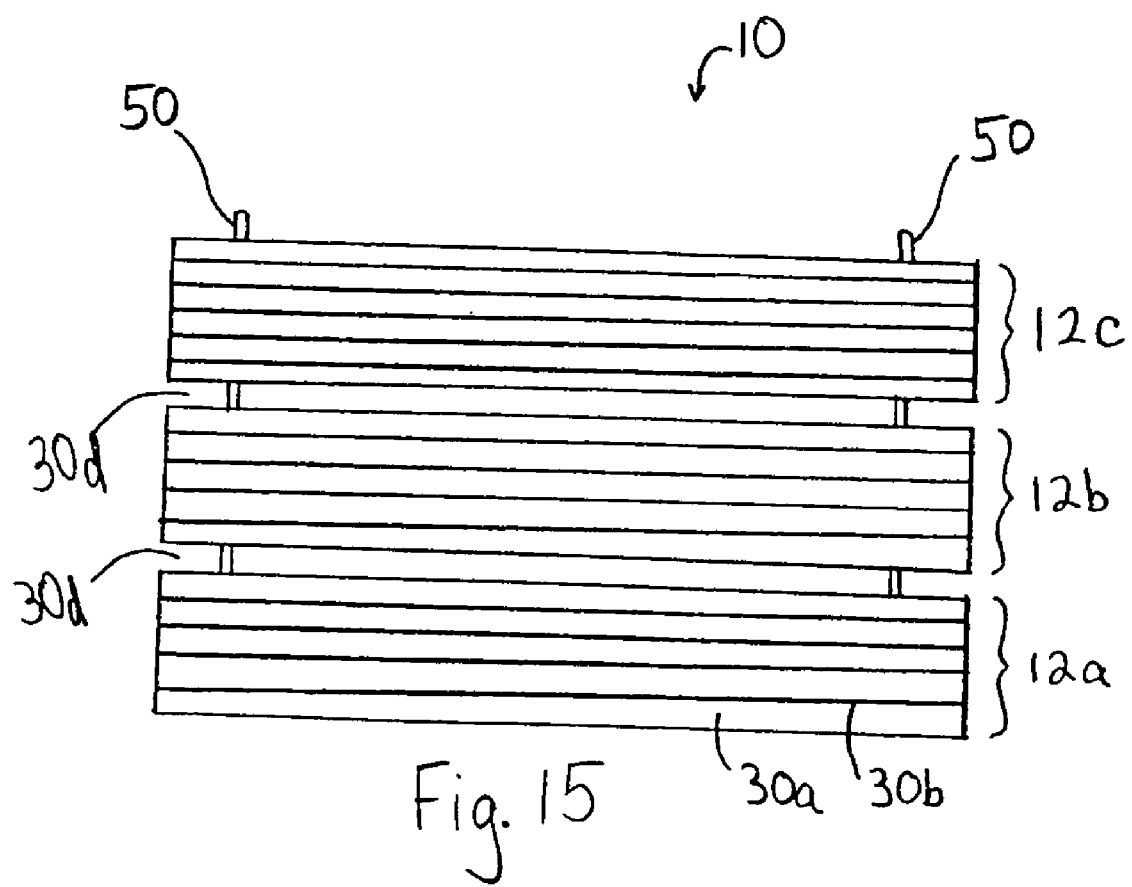
FIG. 15 is a front view of an optical panel system provided in three modular sections including support rods which are provided through holes in each waveguide of each modular section, in accordance with a preferred embodiment of the present invention.

In another preferred embodiment, rather than providing the optical panel 12 comprised of a waveguide stack comprising single, loose, separable waveguides, the optical panel may instead be provided using a plurality of modular-type waveguide stack sections 12a, 12b, 12c as illustrated in FIG. 15. For example, each of the particular sections 12a, 12b, 12c contain waveguides 30 (referred to as sub-waveguides) which function substantially identically to that of the waveguides 30 described in the embodiments above. These sub-waveguides within a particular section are laminated together using known techniques such as, for example, those described in U.S. Pat. No. 6,301,417 issued to Biscardi et al and U.S. Pat. No. 6,487,350 issued to Veligdan et al. Once formed, these sections 12a, 12b, 12c may be substituted for any of the individual waveguides 30 or plurality of waveguides 30 described in the above embodiments, and may be used with any of the support systems described above substantially identically as well. FIG. 15 illustrates an optional layer of air 30d provided between the sections 12a, 12b, 12c. The optional layer of air 30d may be provided, for example, by any of the waveguide positioning elements 51, 151 described above.

A coupler may optionally be used at the sub-inlet faces of each of the sections 12a, 12b, 12c to thereby redirect image light entering the sub-inlet faces. This coupler may be in the form of an additional sheet or layer formed on each of the waveguide sections or may be embedded within ends of the individual sub-waveguides prior to or after the lamination process forming the sections. A diffuser may similarly be incorporated/formed at/embedded at the sub-outlet faces. The various forms/formation techniques of the coupler and diffuser described in this embodiment may also be utilized in the other embodiments.

U.S. Pat. Nos. 6,301,417 and 6,487,350 describe various materials and formation techniques for waveguide cores (strips), claddings, black layers, and couplers which may be utilized in any of the embodiments described above.

The above embodiments describe the optical panel system 10 as the type where image light is received at an inlet face 20 and is displayed at an outlet face 22 (i.e. a pass-through type image projection device). However, it is to be understood that the support system described in the embodiments above may alternatively be employed in a front projection type device such as, for example, that described in U.S. Pat. No. 6,535,674 issued to Veligdan. In this front projection type device, the light is received at an inlet face of a waveguide stack and is reflected by at least one reflector provided at a back face of the waveguides, wherein the reflector redirects the image light back toward the inlet face which simultaneously serves as the outlet face.

Those of ordinary skill in the art will recognize that various modifications and variations may be made to the embodiments described above without departing from the spirit and scope of the present invention. For example, the edge structure(s) from one embodiment (e.g. FIG. 5) may be utilized in combination with edge structure(s) from other embodiment(s) (e.g. FIG. 7). In one example, the dovetail engagement configuration depicted in FIG. 5 may be utilized on one edge of the waveguide stack while the other edge of the waveguide stack may utilize the U-Shaped engagement configuration depicted in FIG. 7. It is therefore to be understood that the present invention is not limited to the particular embodiments disclosed above, but it is intended to cover such modifications and variations as defined by the following claims.

The invention claimed is:

1. An optical panel system for displaying a projected light image, comprising:

a plurality of planar optical waveguides in a stacked state, each waveguide having a first end thereby defining a plurality of first ends, and a second end thereby defining a plurality of second ends, wherein an inlet face is defined by the plurality of first ends; and a support system that aligns and supports the waveguides in the stacked state such that the waveguides are in a predetermined configuration;

wherein the support system comprises at least two opposing edge structures having the waveguides positioned therebetween, and wherein the at least two opposing edge structures engage opposite edges of each waveguide to thereby provide the waveguides in the predetermined configuration; and wherein each waveguide is held in position relative to an adjacent waveguide using the support system while the waveguides are in the predetermined configuration, wherein at least one of the at least two opposing edge structures contains a mating surface, wherein at least one of the opposite edges of each waveguide contains a mating surface which is complementary to the mating surface of the at least one opposing edge structure, wherein each mating surface of the at least one opposing edge structure engages a corresponding complementary mating surface of the at least one of the opposite edges of each waveguide to thereby provide the waveguides in the predetermined configuration, and wherein at least one mating surface of the at least one opposing edge structure is substantially dovetail-shaped.

2. The optical panel system of claim 1, wherein at least one of the at least two opposing edge structures is a rod.

3. The optical panel system of claim 1, wherein at least one mating surface of the at least one opposing edge structure is substantially L-shaped and engage a corner of each waveguide.

4. The optical panel system of claim 1, wherein at least one mating surface of the at least one opposing edge structure is substantially U-shaped.

5. The optical panel system of claim 1, wherein each opposing edge structure contains a mating surface, wherein opposite edges of each waveguide contain mating surfaces which are complementary to the mating surfaces of the opposing edge structures, and wherein each mating surface of the opposing edge structures engages a corresponding complementary mating surface of the opposite edges of each waveguide to thereby provide the waveguides in the predetermined configuration.

6. The optical panel system of claim 5, wherein at least one of the mating surfaces of the opposing edge structures is substantially dovetail-shaped.

7. An optical panel system for displaying a projected light image, comprising:

a plurality of planar optical waveguides ma stacked state, each waveguide having a first end thereby defining a plurality of first ends, and a second end thereby defining a plurality of second ends, wherein an inlet face is defined by the plurality of first ends; and a support system that aligns and supports the waveguides in the stacked state such that the waveguides are in a predetermined configuration;

wherein the support system comprises at least two opposing edge structures having the waveguides positioned therebetween, and wherein the at least two opposing edge structures engage opposite edges of each waveguide to thereby provide the waveguides in the predetermined configuration; and wherein each waveguide is held in position relative to an adjacent waveguide using the support system while the waveguides are in the predetermined configuration, wherein each of the waveguides have a width which differs from an adjacent waveguide while the waveguides are in the predetermined configuration, and wherein at least one of the at least two opposing edge structures is slanted so as to accommodate the varying-width waveguides while the waveguides are in the predetermined configuration.

8. The optical panel system of claim 1, wherein the opposing edge structures contain a plurality of waveguide positioning elements which position each waveguide a predetermined distance from an adjacent waveguide.

9. The optical panel system of claim 8, wherein at least one waveguide positioning element comprises an item selected from the group consisting of a bead, hook, indent, groove, protrusion, notch, tab, nail, screw, bolt, spike, pin, brad, tack, and combinations thereof.

10. The optical panel system of claim 1, wherein the waveguides consist of transparent strips formed of a material having a first index of refraction, and wherein each of the strips is surrounded by air having a second index of refraction which is lower than the first index of refraction while the waveguides are in the predetermined configuration.

11. The optical panel system of claim 10, wherein a black strip is positioned between each of the strips surrounded by air.

12. The optical panel system of claim 1, wherein the waveguides comprise transparent strips formed of a material having a first index of refraction, and wherein each of the strips has a coating on each side thereof of a cladding material having a second index of refraction which is lower than the first index of refraction.

13. The optical panel system of claim 12, wherein at least one of the cladding material coatings of each strip has a black layer coating thereon.

14. The optical panel system of claim 1, wherein the waveguides are comprised of a material selected from the group consisting of a polymer, a plastic, a glass, and combinations thereof.

15. The optical panel system of claim 1, wherein an outlet face is defined by the plurality of second ends, and wherein the inlet face is substantially parallel to the outlet face, and the inlet face and the outlet face are substantially perpendicular to a direction of image light within each of the waveguides.

16. The optical panel system of claim 1, wherein an outlet face is defined by the plurality of second ends, and wherein the inlet face is substantially parallel to the outlet face, and the inlet face and the outlet face are angled relative to a direction of image light within each of the waveguides.

17. The optical panel system of claim 1, wherein an outlet face is defined by the plurality of second ends, and wherein the inlet face is angled relative to the outlet face.

18. The optical panel system of claim 1, wherein an outlet face is defined by the plurality of second ends, and wherein at least one of the inlet face and the outlet face is curved.

19. The optical panel system of claim 1 further comprising at least one coupler provided at the inlet face to thereby redirect image light entering the inlet face.

20. The optical panel system of claim 1, wherein each of the plurality of first ends of the waveguides is beveled such that the inlet face is serrated to thereby redirect image light entering the inlet face.

21. The optical panel system of claim 1, wherein an outlet face is defined by the plurality of second ends, and wherein each of the plurality of second ends of the waveguides is beveled such that the outlet face is serrated to thereby redirect image light emitted from the outlet face.

22. The optical panel system of claim 1, wherein each waveguide comprises a transparent strip which is at least 10 feet in width.

23. The optical panel system of claim 1, wherein each waveguide comprises a transparent strip which is at least 10 feet in width, at least 0.15 inch in thickness, and at least 1 inch in length.

24. The optical panel system of claim 1, wherein an outlet face is defined by the plurality of second ends, and wherein at least one waveguide extends in one direction completely across the outlet face.

25. The optical panel system of claim 1, wherein the optical panel system further comprises a plurality of waveguide positioning elements which position each waveguide a predetermined distance from an adjacent waveguide.

26. The optical panel system of claim 25, wherein the waveguide positioning elements are located between adjacent waveguides such that each waveguide is surrounded by air while the waveguides are in the predetermined configuration.

27. The optical panel system of claim 26, wherein the waveguide positioning elements comprise particulates.

28. The optical panel system of claim 27, wherein the particulates are comprised of a polymer, a plastic, a glass, or combinations thereof.

29. The optical panel system of claim 25, wherein the waveguide positioning elements are located between adjacent waveguides, and wherein the waveguide positioning elements comprise particulates.

30. The optical panel system of claim 29, wherein the particulates are comprised of a polymer, a plastic, a glass, or combinations thereof.

31. The optical panel system of claim 1, wherein each waveguide comprises a plurality of planar sub-waveguides.

32. The optical panel system of claim 31, wherein each sub-waveguide is bonded to an adjacent sub-waveguide within each waveguide.

33. The optical panel system of claim 1, wherein each waveguide comprises a plurality of planar sub-waveguides, wherein each sub-waveguide is bonded to an adjacent sub-waveguide within each waveguide, wherein each sub-waveguide comprises a transparent strip formed of a material having a first index of refraction, and wherein the strip has a coating on each side thereof of a cladding material having a second index of refraction which is lower than the first index of refraction.

34. The optical panel system of claim 33, wherein at least one of the cladding material coatings of the strip has a black layer coating thereon.

35. The optical panel system of claim 33, wherein each waveguide is surrounded by air while the waveguides are in the predetermined configuration.

36. The optical panel system of claim 33, wherein a sub-inlet face is defined by each first end of each waveguide, wherein the optical panel system further comprises. at least one coupler provided at each sub-inlet face of each waveguide to thereby redirect image light entering the sub-inlet face.

37. The optical panel system of claim 1, wherein each waveguide comprises a plurality of planar sub-waveguides, wherein each sub-waveguide is bonded to an adjacent sub-waveguide within each waveguide, wherein each sub-waveguide comprises a transparent strip formed of a material having a first index of refraction, and wherein the strip has a coating on each side thereof of a cladding material having a second index of refraction which is lower than the first index of refraction.

38. The optical panel system of claim 37, wherein at least one of the cladding material coatings of the strip has a black layer coating thereon.

39. The optical panel system of claim 37, wherein each waveguide is surrounded by air while the waveguides are in the predetermined configuration.

40. The optical panel system of claim 37, wherein a sub-inlet face is defined by each first end of each waveguide, wherein the optical panel system further comprises at least one coupler provided at each sub-inlet face of each waveguide to thereby redirect image light entering the sub-inlet face.

* * * * *